United States Patent
Leong et al.

(10) Patent No.: US 10,146,249 B2
(45) Date of Patent: Dec. 4, 2018

(54) ADAPTIVE RATE-MATCHING FIRST-IN FIRST-OUT (FIFO) SYSTEM

(71) Applicant: Altera Corporation, San Jose, CA (US)

(72) Inventors: Han Hua Leong, Butterworth (MY); Ru Yin Ng, Bayan Lepas (MY); Geok Sun Chong, Bayan Lepas (MY); David W. Mendel, Sunnyvale, CA (US)

(73) Assignee: Altera Corporation, San Jose, CA (US)

( * ) Notice: Subject to any disclaimer, the term of this patent is extended or adjusted under 35 U.S.C. 154(b) by 82 days.

(21) Appl. No.: 15/274,597

(22) Filed: Sep. 23, 2016

(65) Prior Publication Data
US 2018/0088622 A1 Mar. 29, 2018

(51) Int. Cl.
*H04L 7/00* (2006.01)
*G06F 1/08* (2006.01)
*G06F 13/40* (2006.01)

(52) U.S. Cl.
CPC .......... *G06F 1/08* (2013.01); *G06F 13/4068* (2013.01)

(58) Field of Classification Search
CPC .............................. G06F 1/08; G06F 13/4068
USPC ........ 375/372, 225, 375, 376, 240; 370/342, 370/442, 371, 506, 535, 417; 711/154, 711/159; 710/34, 52, 62, 395.1
See application file for complete search history.

(56) References Cited

U.S. PATENT DOCUMENTS

| | | | |
|---|---|---|---|
| 9,880,949 B1* | 1/2018 | Hanchinal | G06F 13/102 |
| 2002/0174273 A1 | 11/2002 | Castellano | |
| 2008/0141063 A1 | 6/2008 | Ridgeway et al. | |
| 2013/0138897 A1* | 5/2013 | Mirza | G06F 1/3225 711/154 |
| 2015/0135041 A1* | 5/2015 | O'Connell | H04L 1/0041 714/776 |
| 2016/0226655 A1* | 8/2016 | Mu | H04L 7/005 |

FOREIGN PATENT DOCUMENTS

| | | |
|---|---|---|
| KR | 10-2016-0055685 A | 5/2016 |
| WO | 2016043816 A1 | 3/2016 |

OTHER PUBLICATIONS

PCT International Search Report & Written Opinion for PCT Application No. PCT/US2017/051162 dated Dec. 27, 2017; 15 Pages.

* cited by examiner

*Primary Examiner* — Dhaval Patel
(74) *Attorney, Agent, or Firm* — Fletcher Yoder, P.C.

(57) ABSTRACT

A control system controls First-In First-Out (FIFO) settings of a receiving system. The control system includes a FIFO settings controller that receives a first signal indicative of a first frequency of data received by the receiving system. The FIFO settings controller receives a second signal indicative of a second frequency of a clock that reads the data received by the receiving system. The FIFO settings controller determines a difference (e.g., a parts-per-million (PPM) difference) between the first frequency and the second frequency. The FIFO settings controller sends a third signal indicative of instructions to adjust FIFO configuration settings based on the PPM difference.

19 Claims, 5 Drawing Sheets

ADAPTIVE RATE-MATCHING FIRST-IN FIRST-OUT (FIFO) SYSTEM

BACKGROUND

This disclosure relates generally to rate matching, and, more particularly, to a first-in first-out (FIFO) system that manages data writing and/or reading from a FIFO buffer using adaptive rate matching.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic devices, such as computers, network servers, televisions, portable phones, gaming devices, and the like, transmit and receive data. For example, a computer may download or upload files from a network server, or a television may download audio-video content from a content source. Data is also transmitted and received by internal components within electronic devices. In general, different electronic devices or different internal components of an electronic device may operate according to clock signals generated by different clock circuitry. Even if two different clock signals are meant to operate at the same frequency, it is possible for the clock signals to vary from one another, even if only very slightly. Yet even slight variations between two clock signals—which may be measured in parts-per-million—could result in lost data if data were transmitted directly between circuitry operating at different clock signals.

As such, a First-In First-Out (FIFO) storage system may be used to store the received data so that the first clock may send data independent of the second clock reading the data while still communicating all the desired data. However, FIFO controls may be statically set based on a range of possible parts-per-million (PPM) differences between the rate of data received and the rate of data read. For example, the PPM difference may be from design specifications of the first and second circuit. As such, these static FIFO settings may be based on the designs of the circuits, and so these FIFO settings may be selected to account for worst-case design scenarios, which may cause increased latency in communicating the data.

SUMMARY

Certain aspects commensurate in scope with the originally claimed disclosure are set forth below. It should be understood that these aspects are presented merely to provide the reader with a brief summary of certain forms of the disclosure might take and that these aspects are not intended to limit the scope of the disclosure. Indeed, the disclosure may encompass a variety of aspects that may not be set forth below.

In one example, a first-in first-out system includes a first-in first-out buffer that is written to at a first frequency and read from at a second frequency. The system includes a controller that receives a first signal indicative of the first frequency. The controller receives a second signal indicative of the second frequency. The controller determines a difference between the first frequency and the second frequency. The controller controls one or more settings of the first-in first-out buffer based at least in part on the difference.

In another example, a method for controlling settings of a first-in first-out buffer of a receiving system includes receiving a first signal indicative of a first frequency at which data can be received and written into the first-in first-out buffer, where the first frequency is based on a transmission clock. The method includes receiving a second signal indicative of a second frequency of a clock at which data is read out of the first-in first-out buffer. The second frequency is based on a core clock of circuitry that is downstream from the receiving system. The method includes determining a difference between the first frequency and the second frequency. The method includes adjusting a first configuration threshold of the first-in first-out buffer based at least in part on the difference.

In another example, a communication system includes a transmitting device that transmits data at a first frequency based on a first clock of the transmitting device. The communication system includes a receiving device that receives the transmitted data and stores the transmitted data in a first-in first-out buffer to be read out at a second frequency based on a second clock of the receiving device. The receiving device includes a first-in first-out buffer settings controller that receives a first signal indicative of the first frequency. The controller receives a second signal indicative of the second frequency. The controller determines a difference between the first frequency and the second frequency. The controller sends a third signal indicative of instructions to adjust a start read threshold setting, a full threshold setting, an empty threshold setting, or any combination thereof, of configuration settings of the first-in first-out buffer based on the difference.

BRIEF DESCRIPTION OF THE DRAWINGS

Advantages of the disclosure may become apparent upon reading the following detailed description and upon reference to the drawings in which.

DETAILED DESCRIPTION

Figure 1:
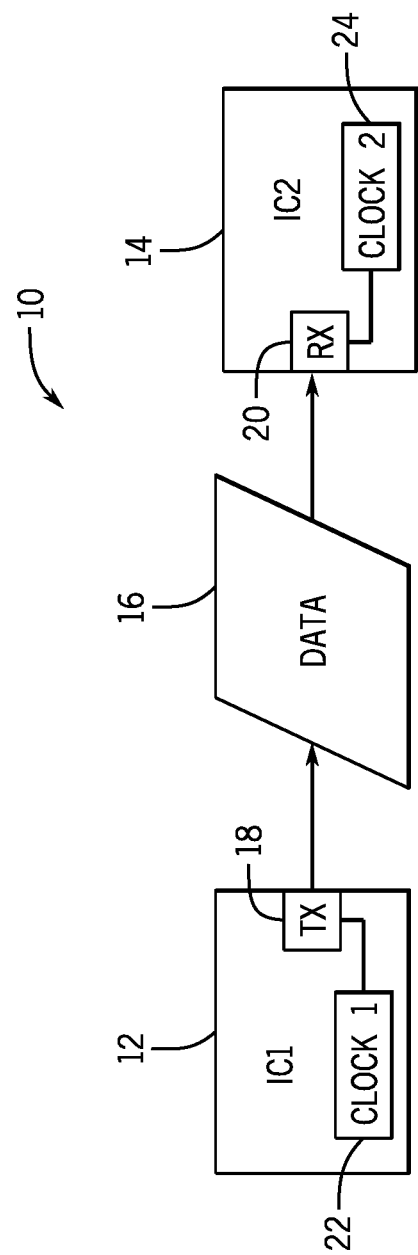
FIG. 1 is a data flow diagram of a First-In First-Out (FIFO) system that includes a receiving system that receives signals from a transmitting system, in accordance with an embodiment.

One or more specific embodiments of the present disclosure will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. The term "or" is intended to be inclusive (e.g., logical OR) and not exclusive (e.g., logical XOR). In other words, the phrase A "or" B is intended to mean A, B, or both A and B.

The present disclosure relates to a First-In First-Out (FIFO) settings controller that adjusts FIFO settings using adaptive rate matching. As explained above, a receiving system may receive data at a different rate that the receiving system reads the data. To account for the different rates, a First-In First-Out (FIFO) storage system may be used to act as a buffer between the rate that data is transmitted and the rate that data is read by the receiving system.

The FIFO is often created based on a difference (e.g., a parts-per-million (PPM) difference) between the rate of data received and the rate of data read. The PPM difference may be from design specifications of the receiving system and the transmitting system. By basing FIFO settings on the designs of the receiving system and the transmitting system, the FIFO settings may cause increased latency in communicating the data. However, an actual PPM difference between the receiving system and the transmitting system may be substantially smaller (e.g., 1-100 PPM, 100-300 PPM, etc.) than the designed tolerance of PPM difference between the transmitting and receiving systems.

To reduce latency in FIFO settings, a control system may determine an actual PPM difference between a frequency of a received signal and a frequency of a clock that reads the received signal. For example, the control system may include a FIFO settings controller that receives a first signal indicative of a first frequency of data received by the receiving system. The FIFO settings controller receives a second signal indicative of a second frequency at which a clock of the receiving system reads the data. The FIFO settings controller determines a parts-per-million (PPM) difference between the first frequency and the second frequency. The FIFO settings controller sends a signal indicative of instructions to adjust FIFO settings based on the PPM difference.

FIG. 1 is block diagram of a First-In First-Out (FIFO) system 10 that includes a transmitting system 12 and a receiving system 14. Each of the transmitting system and the receiving system 14 may include various hardware, such as integrated circuits, field-programmable gate arrays (FPGAs), processing systems, or the like. The transmitting system 12 sends data 16, via one or more signals, to the receiving system 14 which reads the sent data 16 from a FIFO (e.g., FIFO queue) in an order in which the data is received. That is, the first data received is the first data read out from FIFO queue by the receiving system 14.

The transmitting system 12 may include a first transceiver (e.g., transmitter 18) that sends one or more signals to a second transceiver (e.g., receiver 20) of the receiving system 14. The transmitting system 12 may include a first clock 22 that operates at a frequency based on physical properties of the first clock 22. Similarly, the receiving system 14 may include a second clock 24 that operates at a second frequency based on physical properties of the second clock 24. For example, clocks may include a crystal that vibrates at a certain frequency when current is applied to the crystal. The transmitting system 12 and/or the receiving system 14 may include circuitry (e.g., an oscillator) that transforms the vibrations of the crystal into an electrical signal at the certain frequency. As each of the clocks 22 and 24 may have different physical properties from one another, the transmitting system 12 may send data at a different frequency than the receiving system 14 receives data. As such, the FIFO may store the received data until the receiving system 14 reads the received data 16 (e.g., as a buffer).

The FIFO of the receiving system 14 may support a range of parts-per-million (PPM) differences between a frequency of the data 16 received from transmitting system 12 (e.g., the frequency of the clock 22 transmitting the data) and a frequency of the clock 24 of the receiving system that reads the FIFO. As will be appreciated, a higher PPM difference incurs a higher latency. Further, instead of using static settings that are selected based on worst-case design specifications, the FIFO settings may be adjusted based on the actual PPM difference. For example, a transmitting system 12 and receiving system 14 may have a PPM difference of 100 PPM based on the design specifications while the actual PPM difference may be somewhere between 0-100 PPM. Because the FIFO is programmed to support the 100 PPM difference, additional latency in the FIFO may be present when the PPM difference is less than 100 PPM. By controlling the FIFO settings based on the actual PPM difference, the additional latency due to the FIFO may be removed, thereby improving operation of the FIFO. These numbers are meant to be illustrative, and the FIFO settings controller described below may be used with any suitable range of PPM differences.

Figure 2:
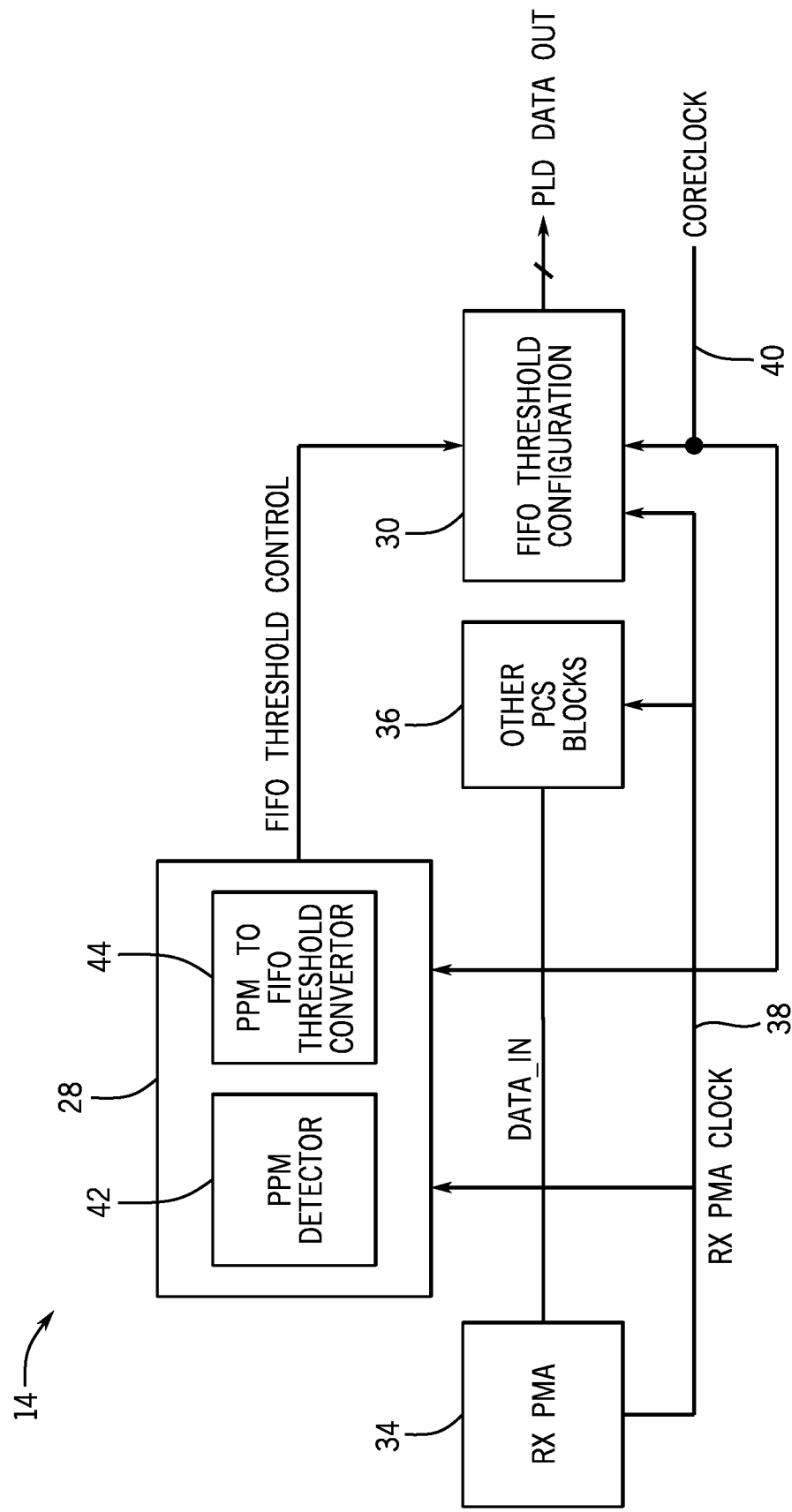
FIG. 2 is a block diagram of the receiving system of FIG. 1 of a receiving system that adapts FIFO settings based on a difference in frequency between a received signal and a clock of the receiving device, in accordance with an embodiment.

FIG. 2 is a block diagram of the receiving system 14 having a FIFO settings controller 28 that controls FIFO configuration settings 30 (e.g., thresholds of the FIFO) based on a detected PPM difference between the received signal and the clock 24 that reads the FIFO to reduce latency in FIFO operations (e.g., reading and/or writing). The FIFO configuration settings 30 may be stored in one or more registers and/or in memory of the receiving system. The receiving system 14 may include a receiving physical medium attachment (RX PMA) 34 that operates as the receiver 20 of the transceiver and receives signals from the transmitting system 12. The RX PMA 34 may send data to a physical coding sublayer (PCS) 36 that performs operations as a digital interface between the RX PMA 34 and the data received by the FIFO of the receiving system 14, such as encoding and/or decoding the data, scrambling and/or descrambling the data, among others.

The RX PMA 34 may receive signals at a first frequency, as indicated by the RX PMA clock 38. Further, as explained above, the receiving system 14 may read data at a second frequency, different and/or independent from the first frequency, as indicated by the core clock 40. The FIFO settings controller 28 may receive a first signal indicative of a first frequency (e.g., rate) of data received, via the RX PMA 34, by the receiving system 14. The first frequency of data received may correspond to a transmission frequency of the clock 22 of the transmitting system 12. The FIFO settings controller 28 may receive a second signal indicative of a second frequency of a clock 24 that reads the FIFO of the receiving system 14.

The FIFO settings controller 28 may include hardware, such as circuits and/or processing systems, to carry out and/or cause to be carried out one or more of the functionalities described herein. For example, FIFO settings controller 28 may include an integrated circuit, system-on-chip (SoC) device, field-programmable gate array (FPGA), a processor (e.g., general purpose processor) or multiple processors, a memory to execute instructions, or the like. Although these are provided as examples, any suitable controller for determining a PPM difference may be used. Further, the FIFO settings controller 28 may include input/outputs (I/O) to receive the first signal indicative of the first frequency of the received data, to receive the second signal indicative of the second frequency of the clock 2, and to send a third signal indicative of instructions to adjust FIFO configuration settings 30 based on a PPM difference between the first and second frequencies.

The FIFO settings controller 28 may include, in memory, parts per million (PPM) detector instructions 42 that a processor executes to detect a PPM difference between the frequency of the clock 24 and the frequency of the received data. That is, the FIFO settings controller 28 may include instructions to determine a PPM difference between the frequency of the data received and the frequency of the clock that reads the FIFO of the receiving system 14. The FIFO settings controller 28 may include, in memory, FIFO threshold conversion instructions 44 that the processor executes to translate the PPM difference into one or more FIFO settings that reduce FIFO latency based on the PPM difference. That is, instead of having fixed FIFO settings (e.g., setting a fixed dynamic partial reconfigurable (DPRIO) setting to be 0 frequency PPM or a maximum tolerable frequency PPM), the FIFO settings controller 28 may include instructions to be executed by the processor that determine an adjusted FIFO settings based on the actual PPM difference (e.g., PPM difference measured from the first signal and the second signal). For example, the FIFO settings controller 28 may include a look up table in memory having PPM differences associated with various FIFO settings. The FIFO settings controller 28 may then send a third signal indicative of instructions to adjust the FIFO settings of the FIFO threshold configurations 30 based on the PPM difference to reduce latency of the FIFO. The FIFO settings controller 28 may send signals to adjust the FIFO threshold configurations 30 dynamically during run-time operations to achieve optimal FIFO latency. Further, long-term clock stability may be monitored by the FIFO settings controller 28 to accommodate variation in the PPM difference over time.

Figure 3:
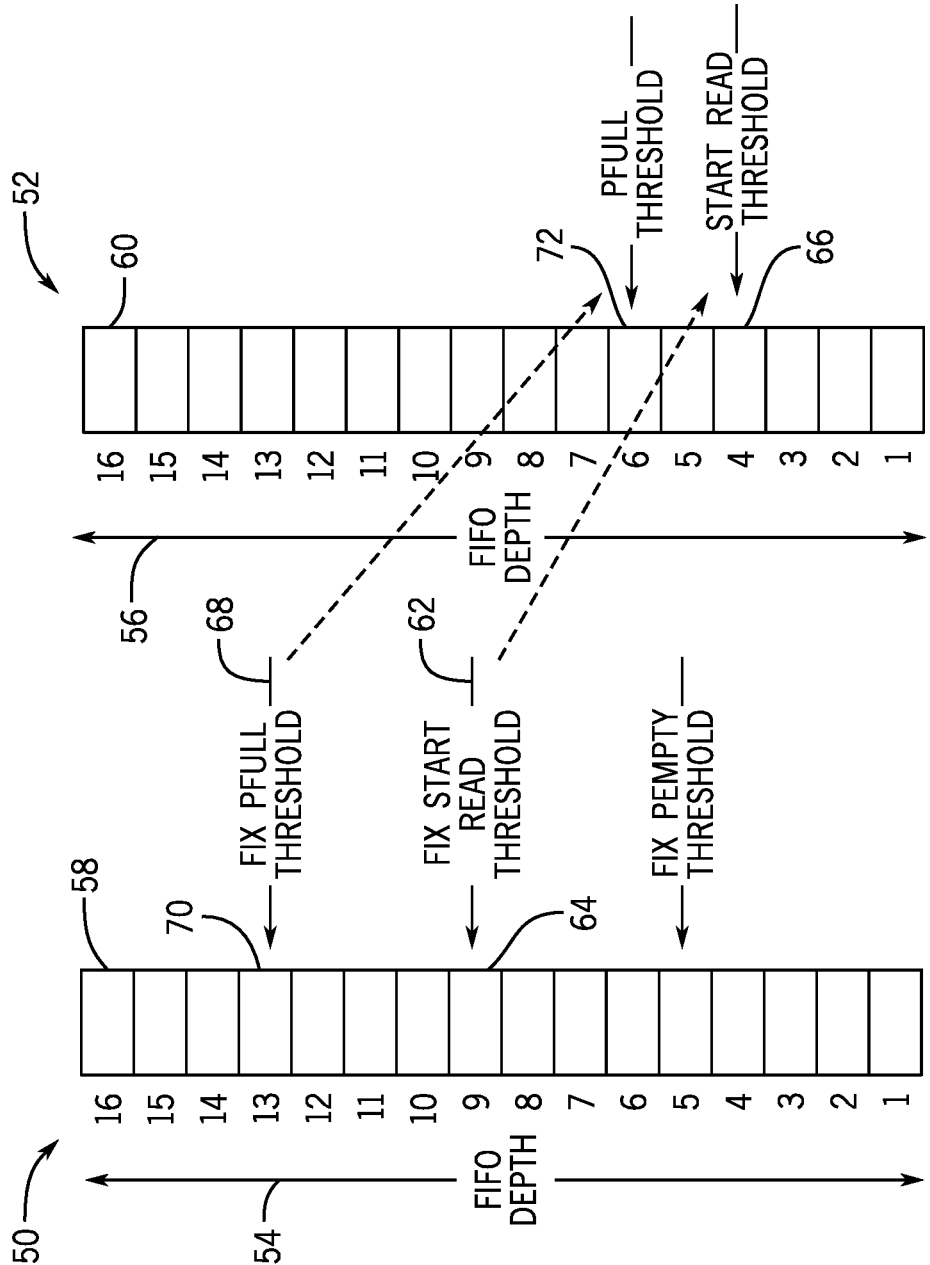
FIG. 3 is a diagram of adjusted FIFO settings of the receiving system of FIG. 2 in which the received signal has a faster frequency than the clock of the receiving device, in accordance with an embodiment.

As explained above, the FIFO settings controller 28 may send signal(s) indicative of instructions to adjust the circuitry and/or memory that stores FIFO threshold configurations 30, such as a start read threshold setting in memory, a full threshold setting in memory, an empty threshold setting in memory, or any combination thereof. FIG. 3 is diagram of a first FIFO 50 prior to receiving adjusted configuration settings and a second FIFO 52 after receiving adjusted configuration settings. The FIFOs 50 and 52 may include one or more sets of data (e.g., bits, bytes, words, or packets). For example, the first and second FIFOs 50 and 52 each include 16 memory locations 58 and 60, respectively, to store words received via the RX PMA 34. While 16 memory locations are used as an example, the FIFO may be any suitable length. In the example shown in FIG. 3, the first frequency of data from the RX PMA 34 is faster than the second frequency of the clock 24 of the receiving system 14 causing the FIFO to tend toward a full condition because the FIFO is receiving more than it is reading.

Because the FIFO tends toward a full condition, the FIFO settings controller 28 may send signal(s) indicative of instructions to adjust the start read threshold to a smaller value to start FIFO read operations earlier to reduce FIFO latency. That is, by starting to read from the FIFO at an earlier point in time when the FIFO tends toward a full condition, FIFO latency may be reduced. Further, a reference to the full start read threshold setting 62 may be set to a smaller value based on the PPM difference. For instance, the reference of the full threshold setting 68 is adjusted from the ninth word 70 to the fourth word 72 to start FIFO read operations earlier than if the start read threshold is not adjusted to reduce FIFO latency. Further, a reference to the full threshold setting 68 may be adjusted from a thirteenth word 70 to a sixth word 72 to reduce an amount that a FIFO pointer drifts, thereby reducing FIFO latency.

Figure 4:
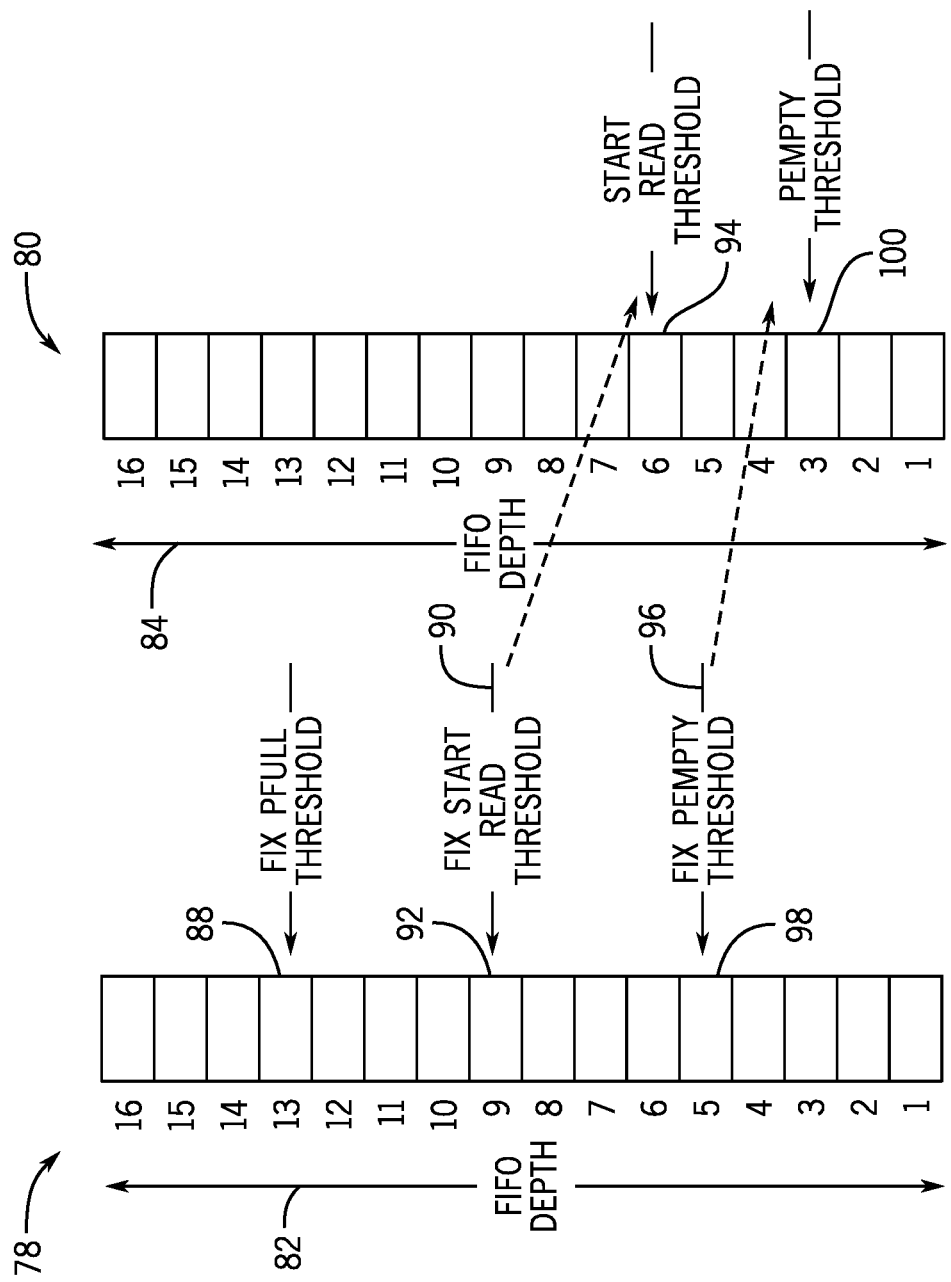
FIG. 4 is a diagram of adjusted FIFO settings of the receiving system in which the received signal has a slower frequency than the clock of the receiving device, in accordance with an embodiment.

The FIFO settings controller 28 may adjust settings of the FIFO if the PPM difference indicates that the second frequency of the clock 24 of the receiving system 14 operates at a faster frequency than the first frequency of the signal received by the RX PMA 34. FIG. 4 is diagram of a first FIFO 78 prior to receiving adjusted configuration settings and a second FIFO 80 after receiving adjusted configuration settings in which the clock 24 has a faster data rate (e.g., frequency) than the data of the received signal via the RX PMA 34. In the illustrated embodiment, each of the FIFOs 78 and 80 includes 16 memory locations 82 and 84, respectively, to store words received via the RX PMA 34.

The FIFO may tend toward an empty condition because the clock of the receiving system 14 is reading data faster than it is receiving data. To reduce FIFO latency, the FIFO settings controller 28 may send signal(s) indicative of instructions to adjust the start read threshold to a smaller value to start FIFO read operations earlier to reduce FIFO latency. For example, if the PPM difference is small (e.g., less than 50 PPM) then the FIFO settings controller 28 may send signal(s) indicative of instructions to reduce a reference to a start read threshold setting 90 from a ninth word 92 (i.e., a prior start read threshold setting) to a sixth word 94 (i.e., an adjusted start read threshold setting) to reduce FIFO latency.

Figure 5:
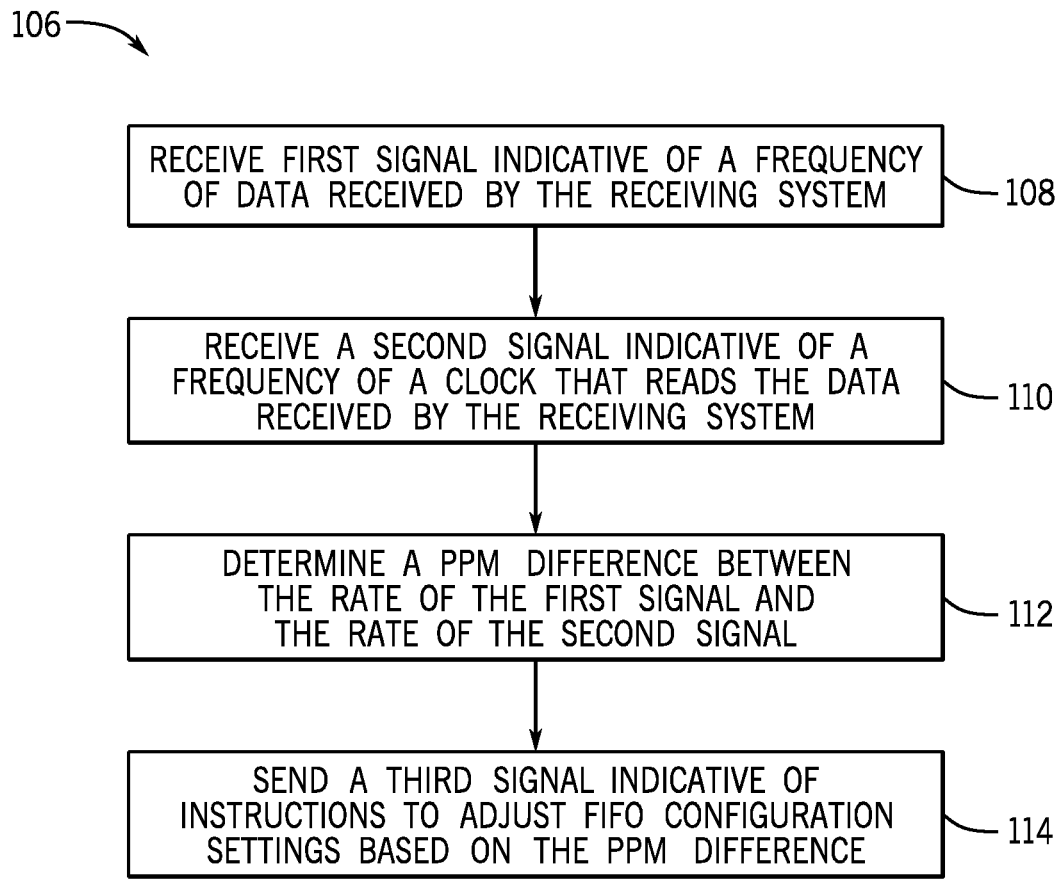
FIG. 5 is a block diagram of a method performed by the receiving system of FIG. 2 to adjust the FIFO settings, in accordance with an embodiment.

FIG. 5 is a flowchart of a method 106 for adjusting FIFO configuration settings to reduce FIFO latency. The FIFO settings controller 28 may receive a first signal indicative of a first frequency of data received by the receiving system 14 (block 108). The FIFO settings controller 28 may receive a second signal indicative of a second frequency at which a clock that reads the data received by the receiving system 14 (block 110). The FIFO settings controller 28 may then determine a PPM difference between the measured frequency of the first signal and the measured frequency of the second signal (block 112). In some embodiments, the FIFO threshold configurations 30 may be dynamically adjusted during run-time operation to achieve lower/optimal FIFO latency. The FIFO settings controller 28 may send a third signal indicative of instructions to adjust FIFO configuration settings based on the PPM difference (block 114). By adjusting FIFO configuration settings based on the actual PPM difference between the first frequency and the second frequency, the FIFO settings controller 28 reduces FIFO latency.

In some embodiments, the FIFO settings controller 28 may operate in continuous adaptation mode in which the FIFO settings controller 28 continuously senses the PPM difference to accommodate new environment changes (e.g., changes in voltage, temperature, etc.) that may alter frequency PPM. For example, the FIFO settings controller may determine a hysteresis level (e.g., threshold level that may be adjusted based on prior PPM differences) to gate the adjustment of FIFO threshold settings up and down dynamically. For instance, the FIFO settings controller 28 may be programmed to have a defined hysteresis level that filters fluctuation of measurement results due to clock stability (e.g., when the clock stability may be measurable but out of user control). The FIFO settings controller 28 may detect a frequency of both clocks (e.g., clocks of the transmitting system 12 and receiving system 14). For example, the FIFO settings controller 28 may detect a million clock pulses and compare a difference in PPM between each of the clocks. In other embodiments, the FIFO settings controller 28 may extrapolate the PPM difference over samples (e.g., less than a million clock pulses). The FIFO settings controller 28 may then adjust FIFO thresholds (e.g., full threshold, the start read threshold, and the empty threshold) accordingly if the hysteresis level is exceeded.

Various factors, referred to as absolute pull range (APR) factors, such as temperature stability, voltage stability, aging (e.g., frequency drift) over time, or the like, may affect stability of the frequency of the received signal with respect to the core clock. As such, the FIFO settings controller 28 may account for stability of the RX PMA frequency and the core clock frequency by determining whether the clock frequencies are stable (e.g., a relationship between the RX PMA clock and the core clock) at a given time, at intervals, or the like. The stability of the frequencies may be within a few PPM when voltages and temperatures are not varied, and stability may change when the voltages and temperatures are varied within the RX PMA, the other PCS blocks, or the programmable logic device (PLD). For example, the temperatures and voltages may be varied The FIFO settings controller 28 may determine that the clock rates are stable by determining that the clock rates do not change (e.g., with respect to one another) beyond a threshold value over a period of time. If the clock rates are determined to be stable and the core clock frequency is slower than the received signal frequency, then the FIFO settings controller 28 may delete idles of the FIFO to adjust the FIFO towards a near empty condition (e.g., with a depth of 2-8 words from empty on a 16-word-deep FIFO). If the clock rates are determined to be unstable, then the FIFO settings controller 28 may instead adjust the FIFO to a centered setting (e.g., with a depth of 8-14 on a 16-word deep FIFO) because idles may be inserted more frequently or deleted more frequently depending on the unstable clock rates.

Technical effects of the present disclosure include adjusting FIFO settings on a receiving device. A FIFO settings controller may receive a first signal indicating a first frequency based on a first clock of a transmitting device. The FIFO settings controller may receive a second signal indicating a second frequency of a second clock of the receiving device. The FIFO settings controller may send a third signal to adjust FIFO configuration settings. By measuring the actual PPM difference, the FIFO settings may be adjusted based on the actual PPM difference. As such, the FIFO settings controller reduces latency of the FIFO by configuring the FIFO based on the actual PPM difference.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A first-in first-out system, the first-in first-out system comprising:
    a first-in first-out buffer that is written to at a first frequency and read from at a second frequency; and
    a controller that:
    receives a first signal indicative of the first frequency;
    receives a second signal indicative of the second frequency;
    determines a difference between the first frequency and the second frequency; and
    adjusts one or more settings of the first-in first-out buffer based at least in part on the difference, wherein the one or more settings of the first-in first-out buffer comprise a threshold level of fullness of the first-in first-out buffer that is used to control when the first-in first-out buffer is written to or read from.

2. The first-in first-out system of claim 1, wherein the threshold level of fullness of the first-in first-out buffer comprises a start read threshold setting, a start write threshold, a full threshold setting, or an empty threshold setting, or any combination thereof.

3. The first-in first-out system of claim 1, wherein the one or more settings of the first-in first-out buffer comprise a start read threshold setting, wherein the controller controls the one or more settings of the first-in first-out buffer at least in part by reducing the start read threshold setting to cause the first-in first-out buffer to be read from earlier than a prior start read threshold setting when the first frequency is greater than the second frequency, which indicates that the first-in first-out buffer is receiving data faster than the data is being read out.

4. The first-in first-out system of claim 1, wherein the one or more settings of the first-in first-out buffer comprise a full-buffer threshold setting, wherein the controller adjusts the full-buffer threshold setting based on the difference.

5. The first-in first-out system of claim 1, wherein the controller determines the difference between the first frequency and the second frequency multiple times during run-time to accommodate variation in the difference over time.

6. The first-in first-out system of claim 5, wherein the controller determines a stability of the difference over time and controls the one or more settings of the first-in first-out buffer based at least in part on the stability of the difference.

7. The first-in first-out system of claim 6, wherein, when stability of the difference is above a threshold level of stability, the controller deletes idle insertions in the first-in first-out buffer that enable the first-in first-out buffer to adjust towards a near-empty condition.

8. A method for controlling settings of a first-in first-out buffer of a receiving system, the method comprising:

receiving a first signal indicative of a first frequency at which data can be received and written into the first-in first-out buffer, wherein the first frequency is based on a transmission clock;

receiving a second signal indicative of a second frequency of a clock at which data is read out of the first-in first-out buffer, wherein the second frequency is based on a core clock of circuitry that is downstream from the receiving system;

determining a difference between the first frequency and the second frequency; and adjusting a first configuration threshold of the first-in first-out buffer based at least in part on the difference.

9. The method of claim 8, wherein the first configuration threshold of the first-in first-out buffer is adjusted when the difference exceeds a threshold level of difference.

10. The method of claim 8, comprising:

determining a stability of the core clock of the circuitry that is downstream from the receiving system, a stability of the transmission clock, or a combination thereof; and adjusting the first configuration threshold or a second configuration threshold of the first-in first-out buffer based at least in part on the stability of the core clock of the circuitry that is downstream from the receiving system, the stability of the transmission clock, or the combination thereof.

11. The method of claim 10, wherein determining the stability comprises determining temperature stability, voltage stability, frequency drift, or any combination thereof.

12. The method of claim 10, comprising deleting idles towards a near empty condition while the core clock of the circuitry that is downstream from the receiving system and the transmission clock are within a certain threshold of stability of fluctuation in the core clock of the circuitry that is downstream from the receiving system and the transmission clock.

13. A communication system, comprising:

a transmitting device that transmits data at a first frequency based on a first clock of the transmitting device; and a receiving device that receives the transmitted data and stores the transmitted data in a first-in first-out buffer to be read out at a second frequency based on a second clock of the receiving device, wherein the receiving device comprises a first-in first-out buffer settings controller that:

receives a first signal indicative of the first frequency;

receives a second signal indicative of the second frequency;

determines a difference between the first frequency and the second frequency; and sends a third signal indicative of instructions to adjust a start read threshold setting, a full threshold setting, an empty threshold setting, or any combination thereof, of configuration settings of the first-in first-out buffer based on the difference.

14. The communication system of claim 13, wherein first-in first-out buffer settings controller sends the third signal indicative of instructions to adjust a number of words in the first-in first-out buffer at which the first-in first-out buffer starts reading out the data as the start read threshold setting.

15. The communication system of claim 14, wherein the first-in first-out buffer settings controller reduces the number of words in the first-in first-out buffer to a smaller value when the second frequency is faster than the first frequency.

16. The communication system of claim 13, wherein the first-in first-out buffer settings controller reduces the full threshold setting based on the difference.

17. The communication system of claim 13, wherein the first-in first-out buffer settings controller determines the difference multiple times during run-time operations to accommodate variation in the difference over time.

18. The communication system of claim 13, wherein the first-in first-out buffer settings controller adjusts fixed dynamic partial reconfigurable input output (DPRIO) settings based on the difference.

19. The communication system of claim 13, wherein the first-in first-out buffer settings controller adjusts one or more first-in first-out buffer thresholds when the difference exceeds a threshold level.

* * * * *